(12) United States Patent
Rafi et al.

(10) Patent No.: US 7,650,119 B2
(45) Date of Patent: Jan. 19, 2010

(54) WIRELESS COMMUNICATION SYSTEM AND METHOD USING DIGITAL CALIBRATION TO CONTROL MIXER INPUT SWING

(75) Inventors: Aslam A. Rafi, Austin, TX (US); Donald A. Kerth, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 620 days.

(21) Appl. No.: 11/341,990

(22) Filed: Jan. 27, 2006

(65) Prior Publication Data

US 2007/0060071 A1    Mar. 15, 2007

Related U.S. Application Data

(63) Continuation-in-part of application No. 11/263,449, filed on Oct. 31, 2005, now abandoned.

(60) Provisional application No. 60/717,578, filed on Sep. 15, 2005.

(51) Int. Cl.
  *H04B 1/40* (2006.01)
(52) U.S. Cl. ............................ 455/76; 455/78; 455/118; 455/260; 455/180.3; 455/192.1; 455/318; 327/530; 327/330; 327/534; 331/177; 331/105; 331/179
(58) Field of Classification Search ............... 455/76, 455/78, 118, 260, 318, 192.1, 180.3; 327/530, 327/330, 534, 105; 331/177, 179
See application file for complete search history.

(56) References Cited

U.S. PATENT DOCUMENTS 6,226,506 B1 *  5/2001 Welland et al. ............. 455/260
6,308,055 B1 * 10/2001 Welland et al. ............. 455/260
6,311,050 B1 * 10/2001 Welland et al. ............. 455/260
6,388,536 B1 *  5/2002 Welland ................. 331/177 R
6,483,390 B2 * 11/2002 Welland ..................... 331/36 C
6,549,765 B2 *  4/2003 Welland et al. ............. 455/260
6,741,846 B1 *  5/2004 Welland et al. ............. 455/260
6,760,575 B2 *  7/2004 Welland ..................... 455/260
6,946,898 B1 *  9/2005 Kerth et al. ................. 327/530
7,023,282 B1 *  4/2006 Humpreys et al. ........... 331/1 A
7,064,591 B1 *  6/2006 Humphreys et al. ......... 327/156
7,136,622 B2 * 11/2006 Rofougaran et al. .......... 455/20
7,145,402 B2 * 12/2006 Mattila et al. ................. 331/66
7,274,229 B1 *  9/2007 Humphreys et al. ......... 327/156
7,299,006 B1 * 11/2007 Rofougaran et al. .......... 455/20
7,353,011 B2 *  4/2008 Welland et al. ............. 455/258
7,463,868 B2 * 12/2008 Rofougaran et al. ........ 455/118

OTHER PUBLICATIONS

Brown, "Wideband Mixers Hit High Intercept Points", Microwaves & RF, Sep. 2005.
Reynolds et al., "A Direct Conversaion Receiver IC for WCDMA Mobile Systems", IBM Res. & Dev., vol. 47, No. 2/3, Mar./May 2003.
Verma et al., "A Multiply-by-3 Coupled Ring Oscillator for Low-Power Frequency Synthesis", IEEE J. of Solid State Circuits, vol. 39, No. 4, Apr. 2004.

* cited by examiner

*Primary Examiner*—Marceau Milord
(74) *Attorney, Agent, or Firm*—Mark P Kahler

(57) ABSTRACT

A wireless communication device is disclosed wherein the voltage swing of a local oscillator (LO) signal is controlled to prevent overstressing semiconductor devices in a mixer to which the LO signal is supplied. A quadrature divider supplies the LO signal to the mixer. Digital calibration methodology controls the current that the quadrature divider draws from a power supply to set the voltage swing of the LO signal that the quadrature divider generates.

16 Claims, 6 Drawing Sheets

WIRELESS COMMUNICATION SYSTEM AND METHOD USING DIGITAL CALIBRATION TO CONTROL MIXER INPUT SWING

RELATED PATENT APPLICATIONS

This patent application is a continuation-in-part of, and claims priority to, the U.S. patent application entitled "Wireless Communication System And Method Using Digital Calibration To Control Mixer Input Swing", by inventors Kerth, et al., Ser. No. 11/263,449, filed Oct. 31, 2005, now abandoned which claims the benefit of Provisional U.S. Patent Application Ser. No. 60/717,578, filed Sep. 15, 2005, entitled "Wireless Communication System And Method Using Digital Calibration To Control Mixer Input Swing", both of which are incorporated herein by reference in their entirety.

Furthermore, this patent application is related to the U.S. patent application entitled "System and Method for Biasing Electrical Circuits" by inventor Donald A. Kerth, et al., U.S. Pat. No. 6,946,898, that is assigned to the same Assignee as the subject patent application, and which is incorporated herein by reference in its entirety.

TECHNICAL FIELD OF THE INVENTION

The disclosures herein relate generally to wireless communication systems, and more particularly, to improving the performance of mixers employed in such systems.

BACKGROUND

Modern wireless communication devices typically employ a frequency synthesizer using phase locked loop technology to control the receive frequency of the device. A voltage controlled oscillator (VCO) provides a synthesizer output signal which is locked in frequency and phase to some multiple of a reference frequency provided by a reference oscillator. The synthesizer output signal is applied to a quadrature divider that processes the signal into an in-phase signal and, a quadrature signal, the quadrature signal being 90 degrees out of phase with respect to the in-phase signal.

The in-phase signal is applied as a local oscillator signal, $I_{LO}$, to a mixer in the in-phase or I channel of the communication device. The quadrature signal is applied as a local oscillator signal, $Q_{LO}$, to another mixer in the quadrature or Q channel of the communication device. These mixers may be called the I channel mixer and the Q channel mixer, respectively. The receive signal from an antenna is supplied to both the I channel and Q channel mixers. Thus, the I channel and Q channel mixers mix the receive signal down to some intermediate frequency (IF). Other circuits couple to the I and Q channels to further process IF signals into a baseband signal. Finally, the baseband signal is processed to provide an audio signal that is supplied to an audio output of the communication device to which the user may listen.

The $I_{LO}$ and $Q_{LO}$ signals cause the respective I and Q channel mixers to switch. It is desirable that the I and Q channel mixers still be able to switch despite the presence of large blocking signals along with the desired signal in the receive signal supplied to the mixers. Local oscillator (LO) swing is defined as the voltage excursion of the local oscillator signals, namely the $I_{LO}$ and $Q_{LO}$ signals, supplied to the I and Q channel mixers. A large LO voltage excursion or swing is needed for low noise mixer performance. However, the voltage excursion of the LO swing can be so large that it overstresses or damages transistors within the I and Q channel mixers.

What is needed is a wireless communication method and device that provides a way to control LO swing to address the problems discussed above.

SUMMARY

Accordingly, in one embodiment, a method is disclosed for operating a wireless communication device including a quadrature divider driving a mixer. The method includes supplying, by a signal source, a first radio frequency (RF) signal to a quadrature divider. The method also includes dividing the first RF signal, by the quadrature divider, to provide a divided down second RF signal to the mixer. The method further includes controlling a regulated supply of current into the quadrature divider to select a particular voltage swing for the divided down second RF signal.

In another embodiment, a wireless communication device is disclosed that includes a signal source which provides a first radio frequency (RF) signal exhibiting a first frequency. The device also includes a quadrature divider, coupled to the signal source, that divides the first RF signal to provide a second RF signal exhibiting a second frequency. The second RF signal exhibits a voltage swing. The device further includes a mixer, coupled to the quadrature divider, that mixes the second RF signal with a receive signal to provide an intermediate (IF) frequency signal. The device still further includes a regulated power supply, coupled to the quadrature divider, to provide a controlled amount of current thereto. The device also includes a digital calibration apparatus, coupled to the quadrature divider, that causes the quadrature divider to draw an amount of current from the supply that is selected to control the voltage swing exhibited by the second RF signal.

BRIEF DESCRIPTION OF THE DRAWINGS

The appended drawings illustrate only exemplary embodiments of the invention and therefore do not limit its scope, because the inventive concepts lend themselves to other equally effective embodiments.

DETAILED DESCRIPTION

Figures 1A, 1B:
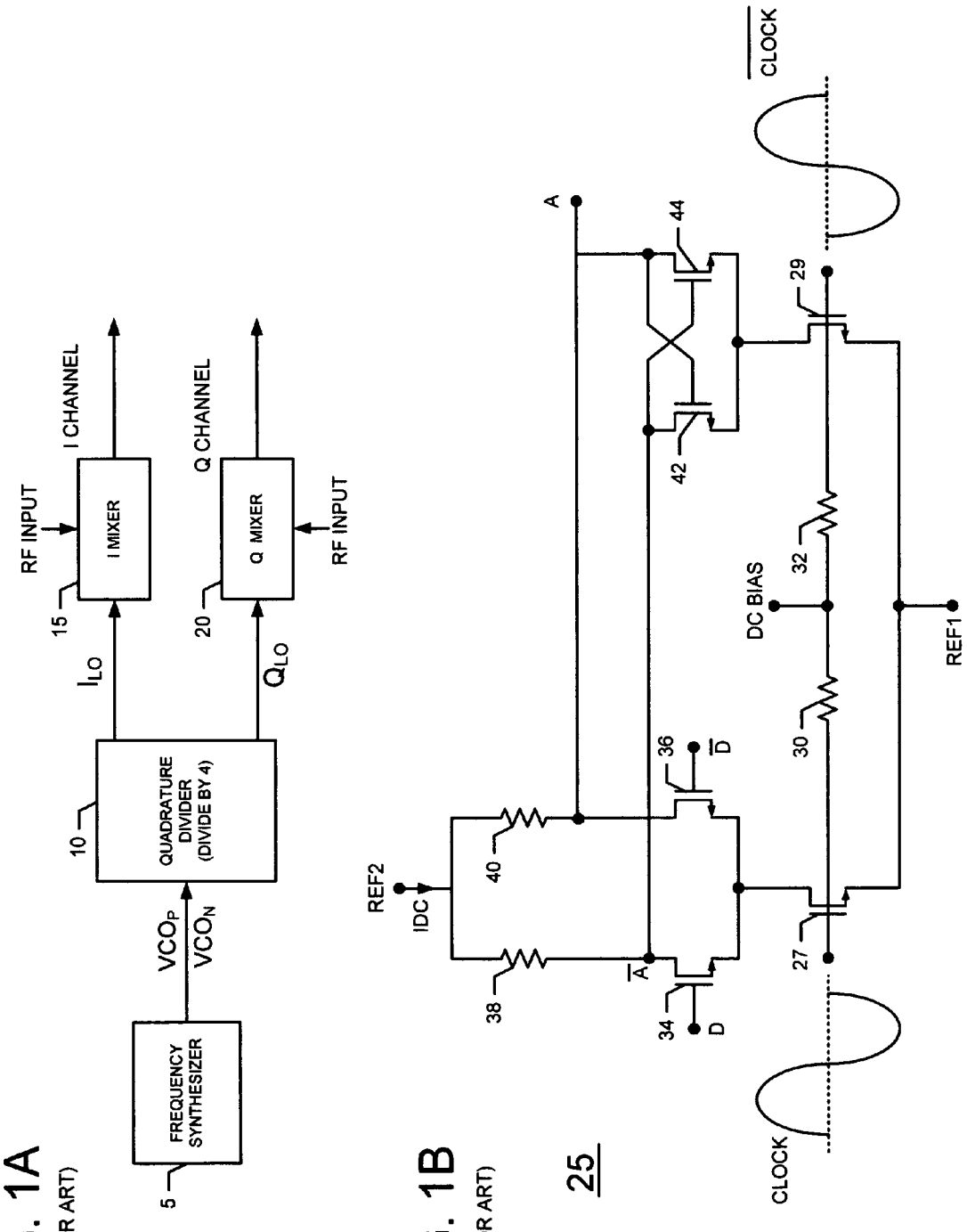
FIG. 1A is a block diagram of a conventional frequency synthesizer and quadrature divider driving I and Q channels of a communication device.
FIG. 1B is a schematic diagram of a conventional latch employed in the quadrature divider of a communication device.

FIG. 1A is a block diagram of a conventional frequency synthesizer 5 and quadrature divider 10 driving I and Q channels of a communication device. More particularly, frequency synthesizer 5 includes a voltage controlled oscillator or VCO (not shown) which generates a differential synthesizer output signal $VCO_P$, $VCO_N$. The synthesizer output signal $VCO_P$, $VCO_N$ is supplied to a quadrature divider 10 which generates an in-phase local oscillator signal, $I_{LO}$, and a quadrature local oscillator signal, $Q_{LO}$. Quadrature divider 10 supplies the $I_{LO}$, and $Q_{LO}$ signals to an I channel mixer 15 and a Q channel mixer 20, respectively, as seen in FIG. 1A. The receive signal which includes a desired signal is applied to another input of I channel mixer 15 and Q channel mixer 20 as shown.

In the arrangement shown in FIG. 1A, the mixers may not switch reliably in the presence a large amplitude blocking signal for all process and temperature corners. It is also possible that large voltage swings in the amplitude of the $I_{LO}$ and $Q_{LO}$ signals may cause over-voltage stress to transistors in mixer 15 and 20. However, large voltage swings in the $I_{LO}$ and $Q_{LO}$ signals are needed for low noise mixer performance. The communication device disclosed below in FIG. 3-5 seeks to control voltage swing in the local oscillator signals $I_{LO}$ and $Q_{LO}$ to avoid overstressing the transistors of the mixer thereof. Moreover, the disclosed communication device seeks to control voltage swing and to still allow the mixer to switch in the presence of strong blocking signals. One example of a blocking signal is a signal that exceeds the desired signal by a large amplitude value such as more than approximately 70 dB in one embodiment.

FIG. 1B is a schematic diagram of one conventional latch circuit 25 that may be employed in quadrature divider 10. More specifically, two latch circuits 25 can be cascaded to form a D flip flop, and two such D flip flops can be configured as a divide by 4 quadrature divider 10 as per standard industry practice.

Latch 25 includes switching transistors 27 and 29 that are coupled together via biasing resistors 30 and 32 as shown. A clock signal, CLOCK, and its complement, /CLOCK, drive the gates of transistors 27 and 29 respectively. A direct bias source, DC BIAS, and a reference voltage source, REF1, supply the transistors 27 and 29 as shown. A pair of transistors 34, 36 couple via load resistors 38, 40, respectively, to a reference voltage source REF2 as shown. The signals D and /D drive the respective gates of transistors 34, 36. The drains of transistors 34, 36 respectively generate the /A and A signals. Latch 25 also includes cross-coupled transistors 42, 44, the common sources of which couple to the drain of transistor 29. The drains of cross-coupled transistors 42, 44 couple to the drains of transistors 34 and 36, respectively, as shown.

A clock signal CLOCK and its complement /CLOCK are respectively AC supplied to switching transistors 27 and 29 as indicated by the waveforms adjacent the gates of transistors 27, 29 in FIG. 1B. Latch 25 operates in the following manner. Data is provided to the D and /D inputs of latch 25. When the CLOCK signal goes high, transistor 27 turns on thus biasing or enabling transistors 34, 36 to service the D and /D data. However, when CLOCK goes high at transistor 27, the /CLOCK signal goes low at transistor 29, thus turning off transistor 29 and effectively decoupling or disabling cross-coupled transistors 42, 44. Then, when the phase of the CLOCK and /CLOCK signal changes, transistor 29 turns on to activate cross-couple transistors 42, 44 which cooperate to latch the data value that was previously at node A.

Figure 1C:
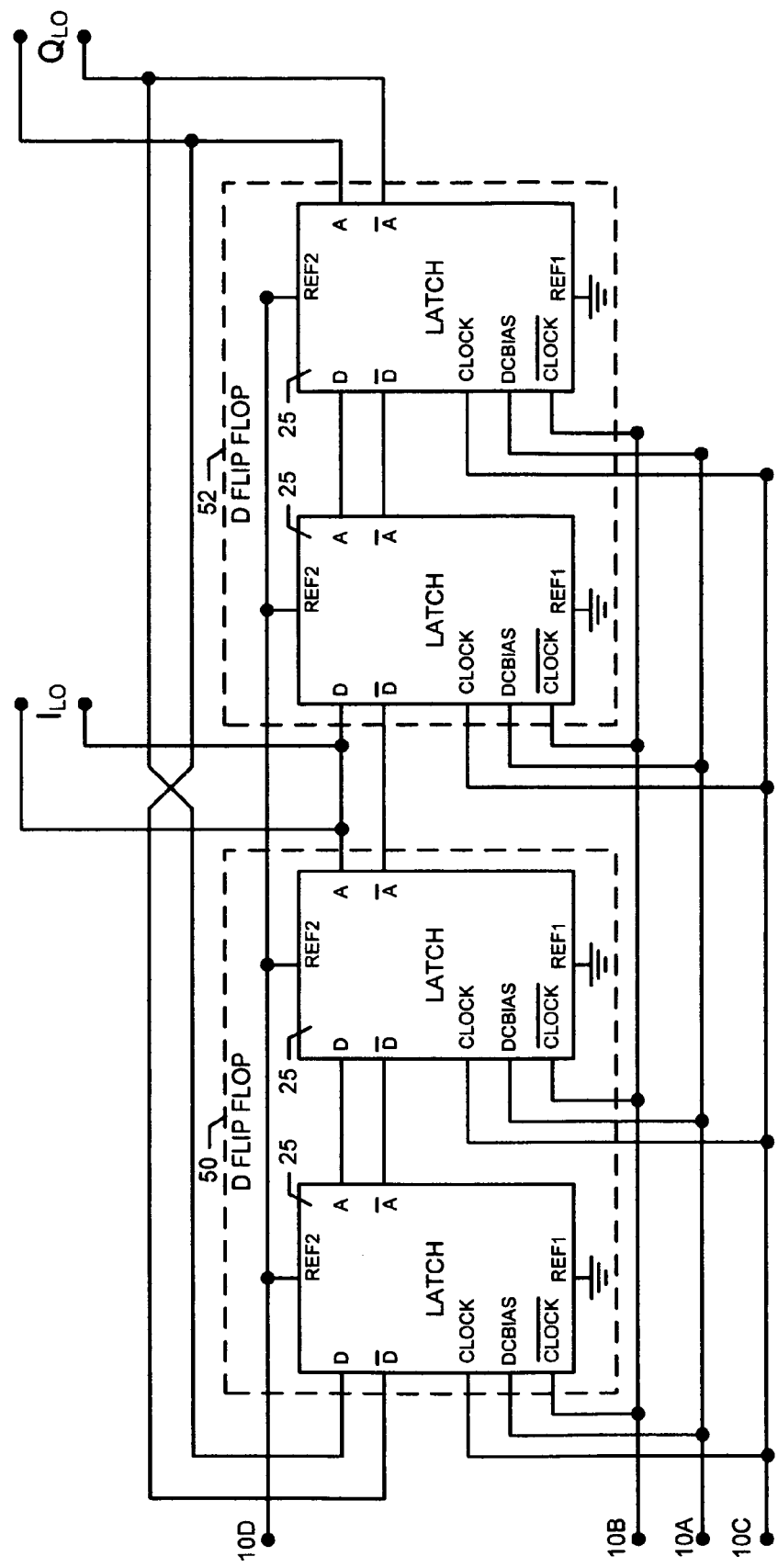
FIG. 1C is a block diagram of a conventional quadrature divider that employs the latches of FIG. 1B.

As mentioned above, two of latches 25 may be cascaded to form a D flip flop, and 2 of these D flip flops may be configured as a divide by 4 quadrature divider such as divider 10 of FIG. 1A according to standard industry practice. FIG. 1C shows a conventional arrangement wherein latches 25 are configured as divider 10. More particularly, two latches 25 are cascaded as shown to form a D flip flop 50 and another two latches 25 are cascaded to form a D flip flop 52. D flip flops 50 and 52 are then cascaded to form quadrature divider 10. Quadrature divider 10 includes inputs 10A, 10B, 10C and 10D of which inputs 10C and 10B are clock and clock bar inputs, input 10D is a reference voltage input and input 10A is a DC bias input. Divider 10 generates an in phase signal, $I_{LO}$, and a quadrature signal, $Q_{LO}$ at the outputs indicated in FIG. 1C.

Figure 2:
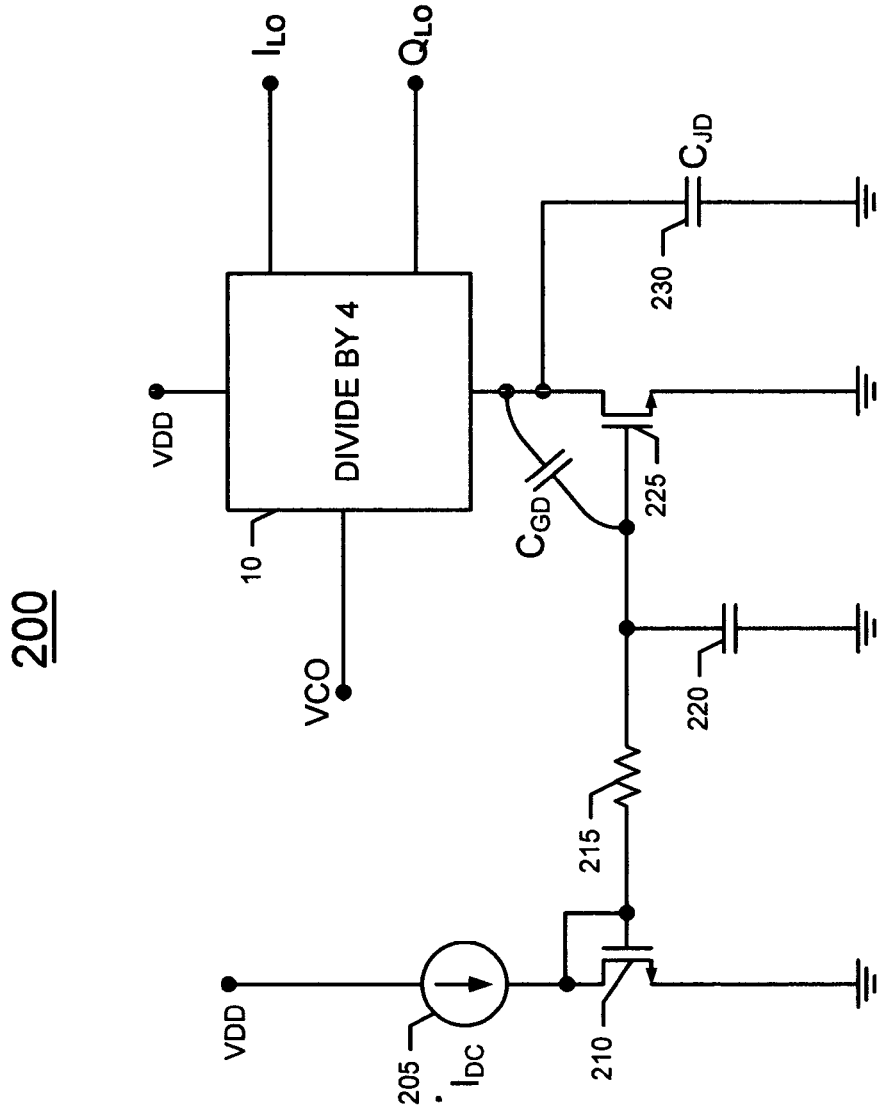
FIG. 2 is a high level schematic diagram of a conventional way to configure the quadrature divider of FIG. 1C.

FIG. 2 is a divider circuit 200 that shows one typical way to hook up quadrature divider 10. As mentioned above, quadrature divider 10 includes an input to which a VCO signal is supplied and an in-phase output, $I_{LO}$, and a quadrature output, $Q_{LO}$, which generate divided down in-phase and quadrature output signals, respectively. A DC current, $I_{DC}$, from current source 205 passes through a diode-connected transistor 210. Resistor 215 and capacitor 220 form an RC noise filter that filters noise in the DC current, $I_{DC}$, and noise generated by transistor 210. The current through transistor 210 is mirrored back through a transistor 225 and feeds divider 10 via the connection of transistor 225 to RC filter 215, 220 and divider 10.

Unfortunately, the circuit arrangement of FIG. 2 encounters a number of problems in practice, such as power supply rejection (PSR) problems, for example. This approach typically requires a long channel length for the current mirror formed by transistor 225, and such a large channel length tends to increase the junction capacitance, CJD, of transistor 225 and the drain to gate parasitic capacitance, CGD, of transistor 225 as well. This increase in the parasitic capacitance of transistor 225 tends to degrade the high frequency power supply rejection (PSR) of divider circuit 200. Although the noise associated with the current, IDC, and transistor 210 is filtered by RC filter 215, 220, the noise associated with current mirror transistor 225 remains unfiltered in this circuit topology. Moreover, in divider circuit 200, the voltage swing exhibited by the in-phase output signal, ILO, and the quadrature output signal, QLO, may be sufficiently large to overstress and damage the transistors of a mixer coupled to the outputs of divider 10. In addition, in the presence of a large blocking signal, a mixer coupled to divider 10 may not switch properly if the referenced voltage swing is not sufficiently large.

Figure 3:
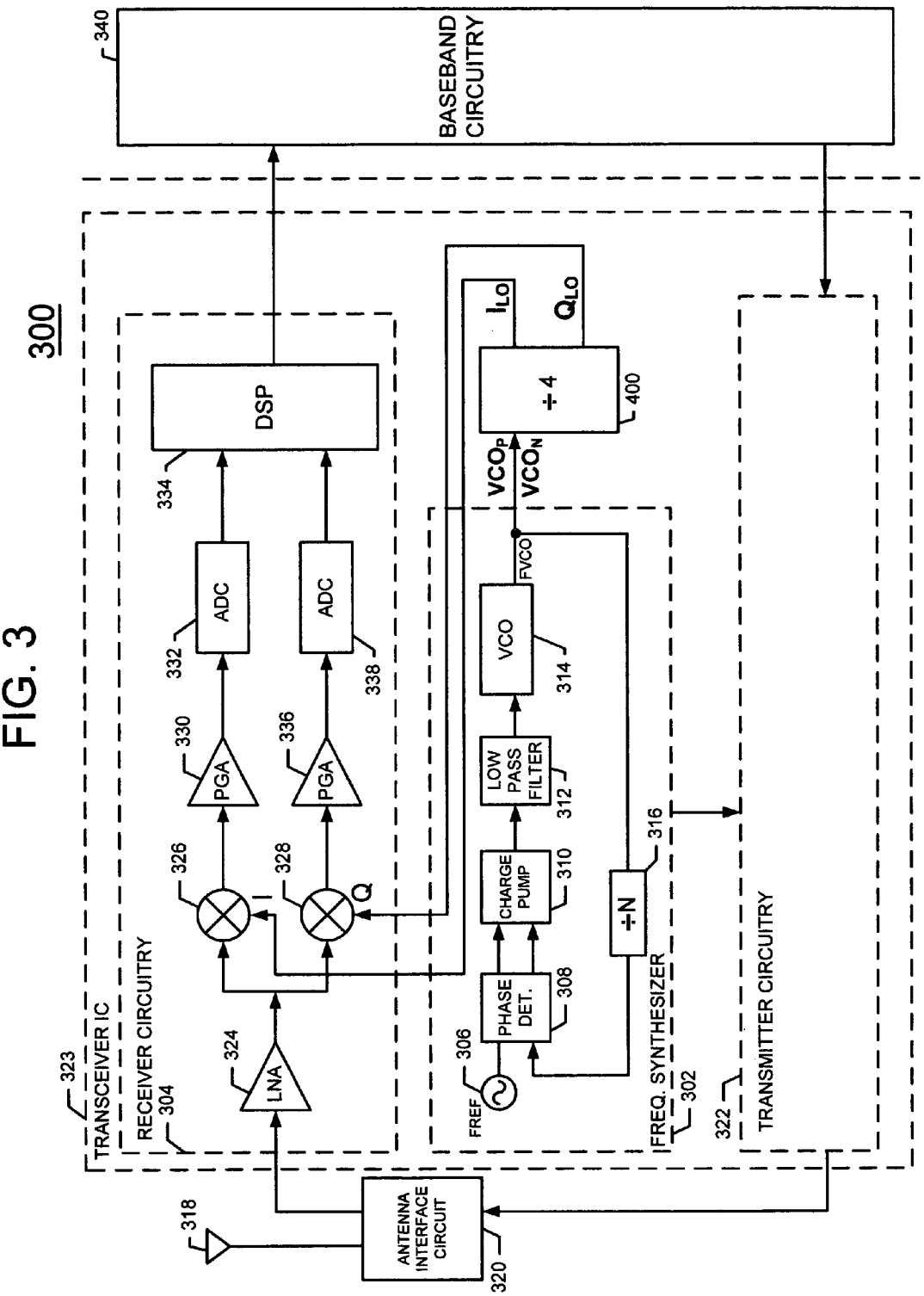
FIG. 3 is a block diagram of a communication device including the disclosed improved mixer technology.
Figure 4:
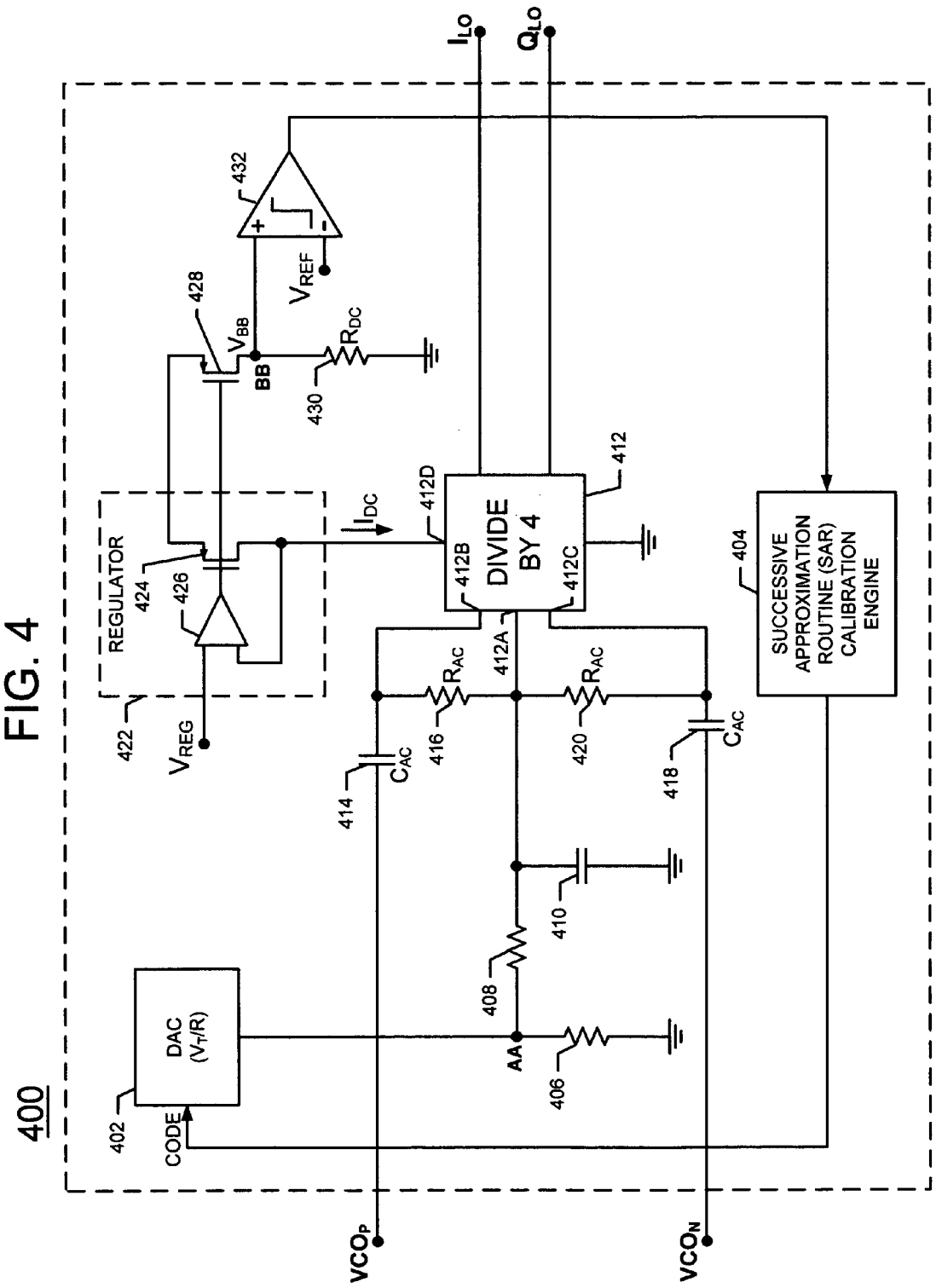
FIG. 4 is a schematic diagram of a quadrature divider that may be used by the communication device of FIG. 3 to provide improved mixer performance.

FIG. 3 is a block diagram of a frequency synthesized communication device 300 in which the quadrature divider 400 of FIG. 4 may be employed. In one embodiment, divider 400 drives the mixers in communication device 300 in a manner wherein the swing of the local oscillator signals driving the mixers of the device is controlled so that semiconductor devices within the mixers are not overstressed, and yet the mixers will still switch in the presence of high amplitude blocking signals.

As seen in FIG. 3, communication device 300 includes a frequency synthesizer 302 which drives the quadrature divider 400 that supplies in phase and quadrature local oscillator signals to receiver circuitry 304. Frequency synthesizer 302 includes a reference frequency oscillator 306, a phase detector 308, a charge pump 310, a low pass filter 312 and a divide by N divider circuit 316, all coupled together as shown in FIG. 3. VCO 314 generates a phase locked loop (PLL) output signal, FVCO, that exhibits a frequency N times the frequency of a reference oscillator 308 signal, FREF. Divider circuit 400 processes the FVCO signal into an in-phase signal, $I_{LO}$, and a quadrature output signal, $Q_{LO}$. In actual practice, the VCO output signal includes differential signals $VCO_P$ and $VCO_N$.

Communication device 300 also includes an antenna 318 coupled to an antenna interface circuit 320 that interfaces receiver circuitry 304 and transmitter circuitry 322 with antenna 318 to facilitate receive and transmit operations. In one embodiment, receiver circuitry 304, transmitter circuitry 322, frequency synthesizer 302 and divider 400 couple together as shown to form a radio frequency transceiver that is integrated on a common transceiver integrated circuit (IC) 323. Antenna interface circuit 320 supplies received signals including the desired signal via low noise amplifier (LNA) 324 to both an in phase or I channel mixer 326 and a quadrature or Q channel mixer 328 as shown. In other words, the output of LNA 324 couples to both an input of I channel mixer 326 and an input of Q channel mixer 328 to supply the receive signal thereto. The $I_{LO}$ and $Q_{LO}$ channel outputs of quadrature divider 400 couple to respective inputs of I channel mixer 326 and Q channel mixer 328 to supply the $I_{LO}$ and $Q_{LO}$ local oscillator signals thereto as shown in FIG. 3.

A programmable gain amplifier (PGA) 330 couples the output of I channel mixer 326 to an analog to digital converter (ADC) 332. ADC 332 digitizes the amplified I (in-phase) signal from I channel mixer 326 and supplies the resultant digitized signal to a digital signal processor 334. Another programmable gain amplifier (PGA) 336 couples the output of Q channel mixer 328 to an analog to digital converter (ADC) 338. ADC 338 digitizes the amplified quadrature signal from Q channel mixer 328 and supplies the resultant digitized signal to digital signal processor 334. Digital signal processor 334 performs signal processing operations on the digitized I and Q signals and transmits the resultant signals to baseband circuitry 340 which is coupled to the output of DSP 334. DSP 334 performs operations such as digital down conversion to baseband, channel filtering and digital gain adjustments. Baseband circuitry 340 is coupled to transmitter circuitry 322 as shown. Transmitter circuitry 322 is coupled to frequency synthesizer 302 such that frequency synthesizer 302 can control the operating frequency of transmitter circuitry 322.

FIG. 4 shows a combined block and schematic diagram of a digitally calibrated quadrature divider circuit that may be employed as divider circuit 400. Divider circuit 400 includes inputs $VCO_P$ and $VCO_N$ which receive the respective differential VCO signals from the VCO 314 of frequency synthesizer 302. Divider circuit 400 also includes outputs $I_{LO}$ and $Q_{LO}$ at which the $I_{LO}$ and $Q_{LO}$ signals are generated. Divider circuit 400 includes a digital to analog converter (DAC) 402 which may be viewed as $V_T/R$, namely a threshold voltage divided by a resistance. A successive approximation routine (SAR) calibration engine 404 couples to DAC 402 to provide a digital calibration code thereto. The particular value of the calibration code at any point in time causes DAC 402 to generate a DAC output signal current which is proportional to the value of the calibration code. The DAC output current flows through resistor 406 thus resulting in a voltage being generated at node AA at resistor 406. This voltage at node AA is filtered by the RC noise filter formed by resistor 408 and capacitor 410. RC noise filter 408, 410 is coupled to input 412A of divider 412 to provide a filtered version of the node AA output signal thereto.

When a divider 10 including latches 25 such as shown in FIG. 1C is employed as divider 412 in divider circuit 400 of FIG. 4, divider 412 inputs 412A, 412B, 412C and 412D correspond respectively to inputs 10A, 10B, 10C and 10D of divider 10. In such an arrangement, the filtered voltage from RC filter 408,410 is provided to the node labeled DC BIAS in latch 25. The value of the filtered voltage from RC filter 408, 410 of FIG. 4 controls the DC voltage of transistors 27 and 29 in latch 25. RC filter 408, 410 provides noise filtering and DAC 402 is inherently low noise.

The VCOP input is AC coupled via capacitor 414 (CAC) and resistor 416 (RAC) to differential clock input 412B of divide by 4 divider 412. The VCON input is AC coupled via capacitor 418 (CAC) and resistor 420 (RAC) to the differential clock input 412C of divide by 4 divider 412. For clarity it is noted that in actual practice resistors 416 and 420 (RAC) may be situated internal to divider circuit 412 as resistors 30 and 32 are internal to latch 25 of FIG. 1B which forms divider 10 of FIG. 1C. A voltage regulator 422 is coupled to voltage input 412D of divider 412 to provide a supply of regulated DC thereto. Voltage regulator 422 includes a regulator transistor 424 coupled to an amplifier 426 with feedback as depicted in FIG. 4. A voltage, VREG, is supplied to one input of amplifier 426 as shown. The sources of transistor 424 and transistor 428 are coupled to the power supply while the drain of transistor 428 is coupled via resistor 430 (RDC) to ground as shown. Transistor 428 mirrors the current through transistor 424. The node, BB, formed at the juncture of the drain of transistor 428 and resistor 430 is coupled to the non-inverting input of a comparator 432. The inverting input of comparator 432 is coupled to a reference voltage, VREF, while the output of comparator 432 is coupled to the input of SAR calibration engine 404.

By adjusting the value of a digital code word provided to DAC 402, SAR calibration engine 404 adjusts the $I_{DC}$ current drawn by divider 412 and, in response, the amount of swing of the $I_{LO}$ and $Q_{LO}$ signals. In other words, adjusting the digital code adjusts the current draw of divider 412 and the swing exhibited by divider 412. The DC value at node AA, namely the output of DAC 402, changes in response to a particular digital code to be calibrated such that divider 412 draws a desired amount of current from regulator 422, that current value being determined as explained below. The band gap voltage of a semiconductor device such as a diode or transistor, for example, does not substantially change with process or temperature. This disclosed circuit takes advantage of this stability. The DC current drawn by divider 412, namely $I_{DC}$, is made to be proportional to the band gap voltage, $V_{BG}$, divided by the resistance $R_{DC}$ of resistor 430. The DC current, $I_{DC}$, drawn by the regulator 422 is mirrored to generate a voltage, $V_{BB}$, at node BB that equals the reference voltage $V_{REF}$ that is supplied to the inverting input of comparator 432. Under these conditions, $V_{BB}=I_{DC} * R_{DC}$ or, in other words, the voltage at node BB, $V_{BB}$, equals $I_{DC}$ times $R_{DC}$. The successive approximation routine (SAR) calibration engine 404 adjusts the digital code supplied to DAC 402 such that the voltage at node BB, $V_{BB}$, equals the reference voltage, $V_{REF}$, at the inverting input of comparator 432. The reference voltage, $V_{REF}$, is set to the band gap voltage, $V_{BG}$. Since the swing of the divider 412 outputs is proportional to $I_{DC}$ times $R_{DC}$, the swing is proportional to $V_{BG}$, a very stable value as explained above.

SAR engine 404 continues to adjust the digital code supplied to DAC 402 to assure that $V_{BB}$ equals $V_{REF}$, thus maintaining the swing of $I_{LO}$ and $Q_{LO}$ at a desired amplitude value which does not overstress the mixer and yet allows the mixer to properly operate in the presence of large block signals. The LO swing does not change significantly with temperature or process because the $V_{BG}$ on which it depends does not change significantly on process or temperature. In one embodiment, the LO swing is set to the maximum permissible voltage that will not overstress the semiconductor components of a mixer coupled to divider circuit 400. Such a high LO swing can significantly improve the mixer's noise performance, especially in the presence of large blocking signals.

It is noted that as the digital code to the DAC 402 changes, the DC bias voltage at node AA changes. This DC bias voltage affects the average gate-source voltage of transistors 27 and 29 of FIG. 1B which are used in latch 25 inside quadrature divider 412. This in turn affects the DC current drawn by the latches in the divider. In other words, a higher voltage at node M causes a higher gate-source voltage on transistors 27 and 29 of FIG. 1B and hence a higher DC current through the divider. However, the DC current drawn by the divider is directly proportional to the swing on $I_{LO}$ and $Q_{LO}$. Thus, we have a means of controlling the swing at the output of the divider by adjusting the code to the DAC 402.

Figure 5:
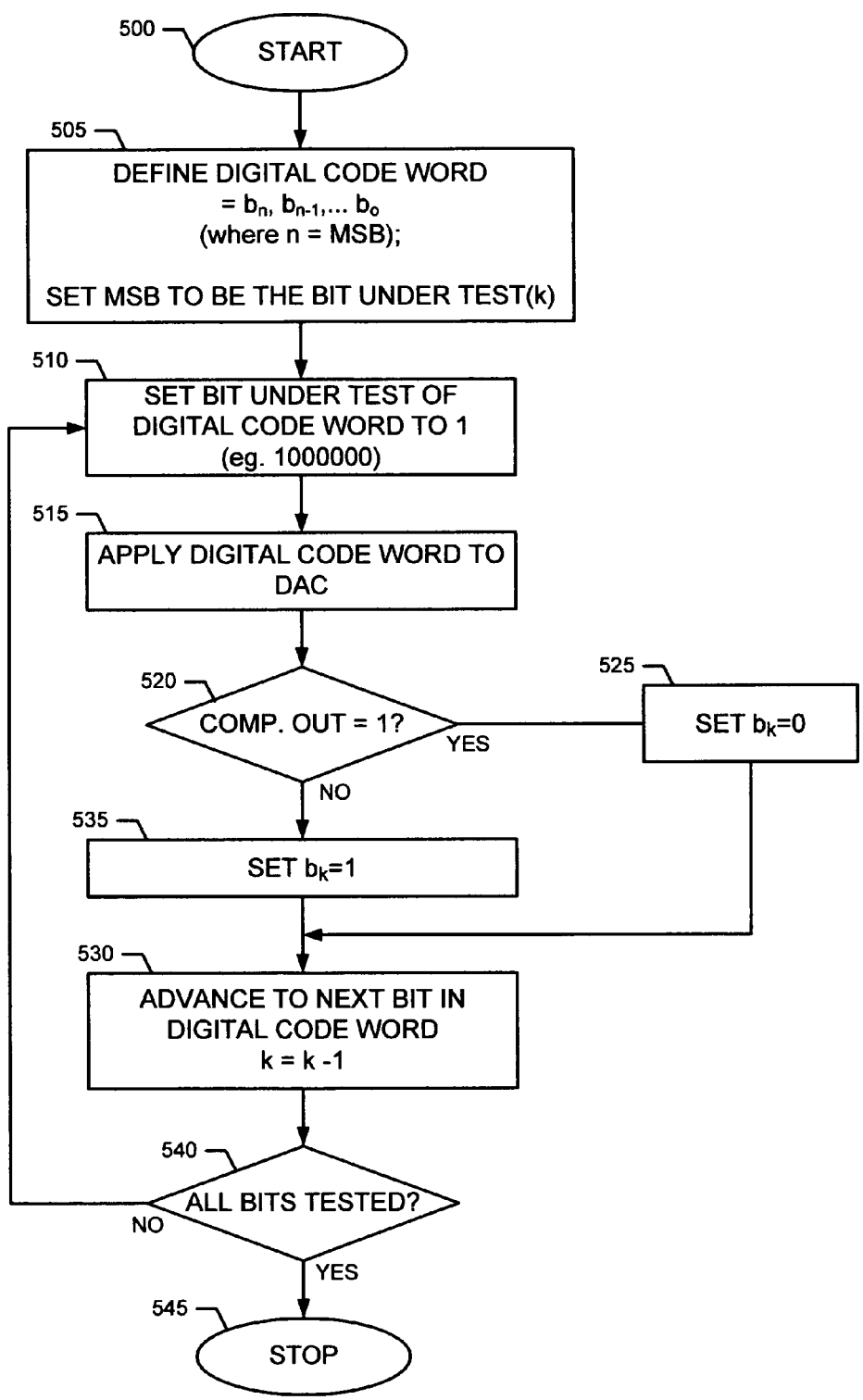
FIG. 5 is a flow chart depicting steps implemented by a successive approximation routine employed by the quadrature divider of FIG. 4.

FIG. 5 is a flowchart showing the steps carried out by successive approximation routine (SAR) calibration engine 404 to provide a digital calibration code or digital code word that seeks to optimize the swing exhibited by divider 412. In one embodiment, digital circuitry such as a digital controller may be employed to implement calibration engine 404 while it is also possible to implement engine 404 in software or firmware if desired. At a high level, calibration engine 404 selects a digital code word and runs the successive approximation routine until the voltage at node BB, $V_{BB}$, equals the reference voltage, $V_{REF}$. The SAR process flow begins at start block 500. The digital code word is defined at block 505. In this particular example, the digital code word generated by SAR calibration engine 404 is 7 bits long, including bits $b_n$, $b_{n-1}$ ... b0 wherein "n" is the most significant bit (MSB), namely 7 minus 1, or 6 here. Bit "$b_k$" corresponds to the particular bit under test of the digital code word wherein k varies from a value of 6 for the MSB of the digital code word to a value of 0 for the least significant bit (LSB) of the digital code word. In this particular embodiment, SAR engine 404 commences testing on the first bit of the digital code word, namely bit $b_6$, as per block 505 which sets the MSB to be the bit under test. SAR engine 404 sets this particular bit under test to a value of 1, thus resulting in an initial digital code word of 1000000, as per block 510. The SAR engine starts with the most significant bit (MSB) of the digital code word and proceeds bit by bit to the least significant bit (LSB) of the digital code word as seen below. In this particular embodiment, the initial digital code word is chosen to have its MSB to be 1 followed by all 0s. This initial digital code word is applied to DAC 402, as per block 515.

SAR 404 then conducts a test at decision block 520 to determine if the comparator 432 output equals 1. If the comparator output-equals 1, this means that the value $V_{BB}$ at the non-inverting input has a value greater than $V_{REF}$. In this event wherein the output of comparator 432 equals 1, SAR engine 404 sets bit $b_k$=0 as per block 525. Process flow then continues to block 530 at which the engine sets k=k−1 to advance to the next bit of the digital code word. However, if decision block 520 determines that the comparator output does not equal 1, then the current bit $b_k$ is set to 1, as per block 535. Process flow then continues again to block 530 wherein the SAR advances to the next bit in the digital code word. A test is then conducted at decision block 540 to determine if all bits of the digital code word were tested. If all bits of the digital code word were not tested, then flow continues back to block 510 which sets the new bit under test to 1. Block 515 then applies the new current digital code word to DAC 402 and the process continues. However, if decision block 540 determines that all bits of the digital code word have already been tested, then the SAR has reached the least significant bit (LSB) of the digital code word and process flow stops at block 545.

In one embodiment, this SAR process may be run each time communication device is turned on. Alternatively, the SAR process may be run once and the results stored in a memory within the communication device for subsequent recall and usage. In another embodiment, the SAR process may be executed multiple times during an operating session of the communication device. With the SAR operation completed, the communication device 300 has determined a digital code word which calibrates the $I_{LO}$ and $Q_{LO}$ outputs of divider 412 to exhibit a controlled amount of swing. In one embodiment, controlling divider swing in this manner avoids overstress on semiconductor devices in a mixer coupled to divider 412 and provides desirable noise performance by the mixer in the presence of blocking signals. In actual practice, the value of the digital code word or calibration code does not change very much over time during divider circuit operation. The calibration code is a function of temperature and, in the period of a TDMA burst, the temperature is fairly constant. However, over many bursts, the temperature is likely to change and hence the code changes as well. The digital code may be varied to select and maintain the swing at the output of the divider relatively constant over time.

Modifications and alternative embodiments of this invention will be apparent to those skilled in the art in view of this description of the invention. Accordingly, this description teaches those skilled in the art the manner of carrying out the invention and is to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. A method of operating a wireless communication device including a quadrature divider driving a mixer, the method of comprising:

supplying, by a signal source, a first radio frequency (RF) signal to a quadrature divider;

dividing the first RF signal, by the quadrature divider, to provide a divided down second RF signal to the mixer; and providing a digital code word to a digital to analog converter (DAC) that drives an input of the quadrature divider, the digital code word being selected to control the voltage swing exhibited by the divided down second RF signal and the current drawn by the quadrature divider.

2. The method of claim 1, wherein the providing the digital code word step is performed by a successive approximation routine.

3. The method of claim 1, wherein the digital code word is varied over time to keep the voltage swing of the divided down second RF signal relatively constant.

4. The method of claim 1, wherein the divided down second RF signal includes in phase and quadrature local oscillator signals that are provided to the mixer.

5. The method of claim 1, wherein the supplying step is performed by a frequency synthesizer.

6. The method of claim 1, further comprising supplying a receive RF signal to the mixer.

7. A wireless communication device comprising:

a signal source that provides a first radio frequency (RF) signal exhibiting a first frequency;

a quadrature divider, coupled to the signal source, that divides the first RF signal to provide a divided down second RF signal exhibiting a second frequency, the second RF signal exhibiting a voltage swing;

a mixer, coupled to the quadrature divider, that mixes the second RF signal with a receive signal to provide an intermediate (IF) frequency signal;

a power supply, coupled to the quadrature divider, to provide current thereto; and a digital calibration apparatus including a digital to analog converter (DAC) that drives an input of the quadrature divider, the digital calibration apparatus providing a digital code word to the DAC that drives an input of the quadrature divider, the digital code word being selected to control the voltage swing exhibited by the divided down second RF signal and the current drawn by the quadrature divider.

8. The wireless communication device of claim 7, further comprising a successive approximation engine, coupled to the DAC, that selects the digital code word.

9. The wireless communication device of claim 7, wherein the digital code word is varied over time to keep the voltage swing of the second RF signal relatively constant.

10. The wireless communication device of claim 7, wherein the second RF signal includes in phase and quadrature local oscillator signals that are provided to the mixer.

11. The wireless communication device of claim 7, wherein the signal source comprises a frequency synthesizer.

12. An integrated circuit comprising:

a signal source that provides a first radio frequency (RF) signal exhibiting a first frequency;

a quadrature divider, coupled to the signal source, that divides the first RF signal to provide a divided down second RF signal exhibiting a second frequency, the second RF signal exhibiting a voltage swing;

a mixer, coupled to the quadrature divider, that mixes the second RF signal with a receive signal to provide an intermediate (IF) frequency signal;

a power supply, coupled to the quadrature divider, to provide current thereto; and a digital calibration apparatus including a digital to analog converter (DAC) that drives an input of the quadrature divider, the digital calibration apparatus providing a digital code word to the DAC that drives an input of the quadrature divider, the digital code word being selected to control the voltage swing exhibited by the divided down second RF signal and the current drawn by the quadrature divider.

13. The integrated circuit of claim 12, further comprising a successive approximation engine, coupled to the DAC, that selects the digital code word.

14. The integrated circuit of claim 12, wherein the digital code word is varied over time to keep the voltage swing of the second RF signal relatively constant.

15. The integrated circuit of claim 12, wherein the second RF signal includes in phase and quadrature local oscillator signals that are provided to the mixer.

16. The integrated circuit of claim 12, wherein the signal source comprises a frequency synthesizer.

\* \* \* \* \*